UNITED STATES PATENT OFFICE.

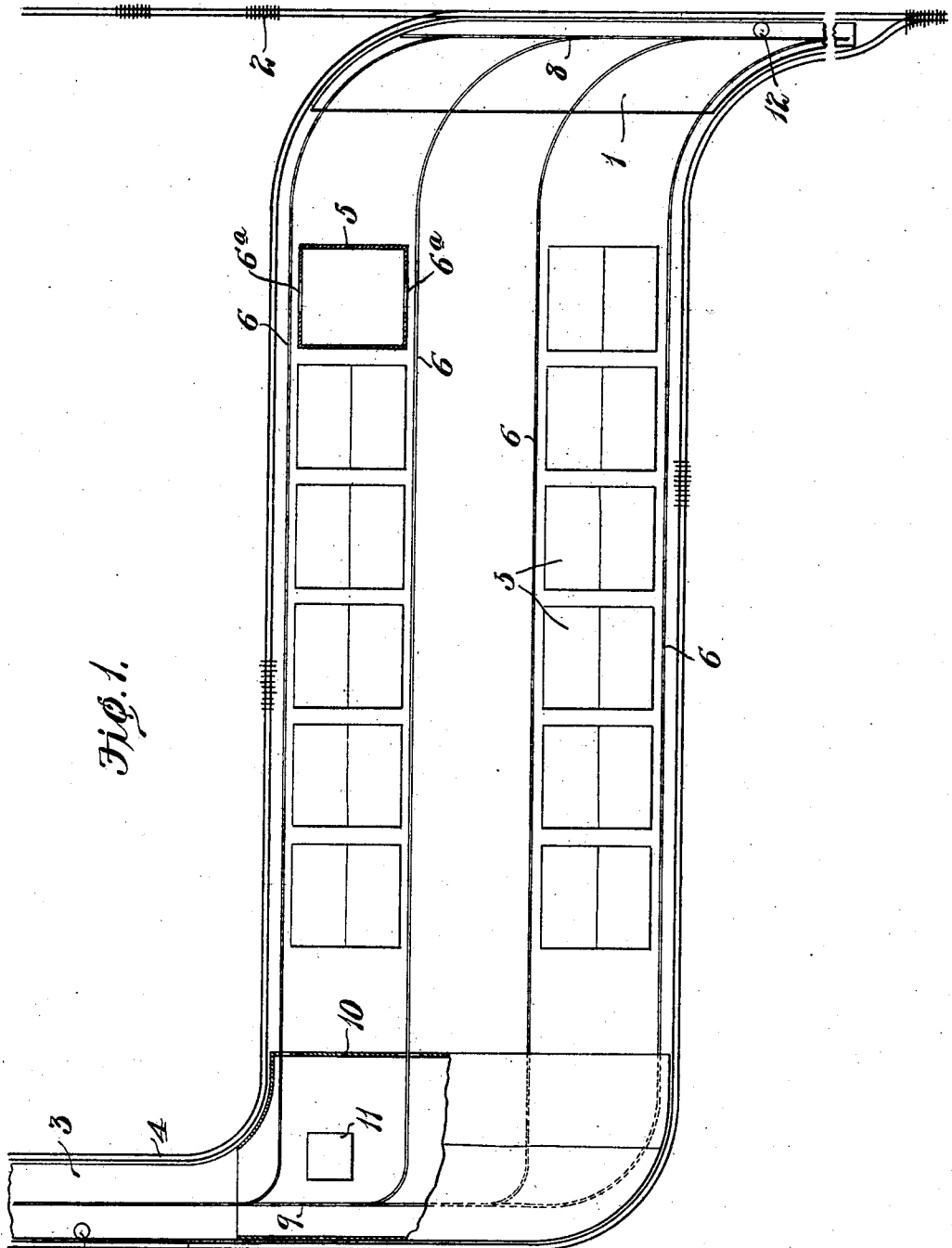

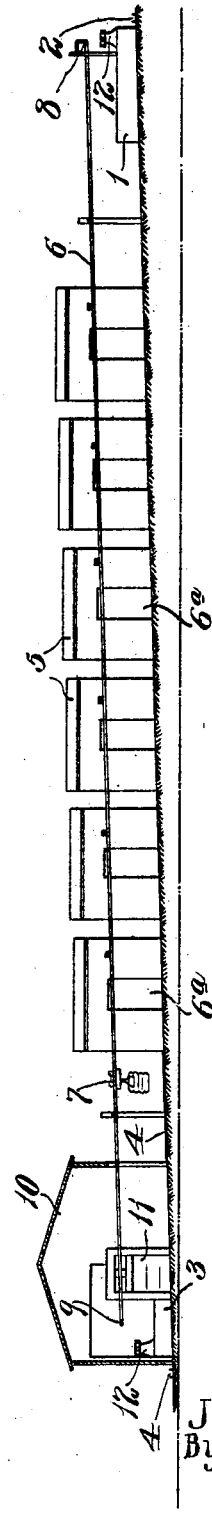

JOHN R. FORDYCE, OF ATLANTA, GEORGIA.

PLANT FOR HANDLING BALED COTTON.

No. 897,972.　　　Specification of Letters Patent.　　　Patented Sept. 8, 1908.

Application filed February 23, 1907. Serial No. 358,906.

*To all whom it may concern:*

Be it known that I, JOHN R. FORDYCE, a citizen of the United States, residing at Atlanta, Georgia, have invented a certain new and useful Improvement in Plants for Handling Baled Cotton, of which the following is a full, clear, and exact description, such as will enable others skilled in the art to which it appertains to make and use the same, reference being had to the accompanying drawings, forming part of this specification, in which—

Figure 1 is a plan view of my plant; and Fig. 2 is an elevational view taken approximately through the longitudinal center of the plant.

This invention relates to a new and useful improvement in a plant for handling baled cotton.
The object of my invention is to provide a plant which is so constructed that baled cotton can be unloaded from the cars or other conveyances which carry it to the plant, assorted, stored, compressed and then re-shipped in an expeditious manner and with very little manual labor.

The plant herein illustrated which represents the preferred form of my invention comprises a receiving station where the cotton is unloaded from the inbound cars, ships or other conveyances, a number of warehouses arranged in rows in which the bales of cotton are stored, a shipping station where the bales are loaded onto the outbound cars or other conveyances which carry them away from the plant, a cotton compressor preferably located adjacent the shipping station and inside of a storage house, and conveyers for carrying the bales and traveling on tracks which extend from the receiving station past the warehouses and compressor to the receiving station.

The conveyers are preferably operated by gravity, the tracks on which they travel being inclined downwardly from the receiving station to the shipping station. The rows of warehouses are located intermediate the receiving and shipping stations and I prefer to build the plant on sloping ground, locating the receiving station at a higher elevation than the shipping station. I also prefer to locate each row of warehouses between two lines of conveyers so that the bales of cotton as they come from the receiving station can be unloaded from the conveyers which travel past the front doors of the warehouses and when said bales are to be removed from said warehouses and carried to the compressor or to the shipping station, they can be taken through the rear doors of the warehouses and placed on the conveyers which travel past said rear doors.

Referring to the drawings which illustrate a plant embodying the features of my invention, 1 designates the receiving station which preferably consists of a long platform alongside of which a wagon road or railway tracks 2 extend. In case the plant is located on a navigable body of water the receiving station would consist of a wharf or pier. The plant is preferably built on inclined ground, as shown in Fig. 2, and the shipping station is located some distance from the receiving station and at a lower elevation than the receiving station. The shipping station consists of a platform 3 having wagon roads or railway tracks 4 extending along both sides thereof, as shown in Fig. 1, or if practicable, the shipping station could consist of a wharf or pier.

Between the receiving and shipping stations are rows of warehouses 5 and extending along the front and rear sides of the warehouses of each row are overhead tracks 6 on which conveyers 7 travel for carrying the bales of cotton. These overhead tracks 6 connect with an overhead track 8 extending longitudinally of the receiving platform 1 and with an overhead track 9 that extends longitudinally of the shipping platform 3 and inside of a storage house 10 arranged adjacent the shipping platform, a cotton compressor 11 being located inside of said storage house. Accordingly, the bales of cotton can be unloaded from the inbound cars at any point on the receiving platform and then hooked onto the conveyers which carry them to the warehouses or direct to the compressor. As the conveyer tracks are inclined downwardly from the receiving station to the shipping station the conveyers will be propelled by gravity so that the expense of power for actuating the conveyers is eliminated.

Instead of building the plant on sloping ground I can build it on level ground and merely have the conveyer tracks inclined. The railroad tracks 4 that extend alongside of the shipping platform are preferably spurs that branch off the main line 2 that extends alongside of the receiving platform, and located on the receiving and shipping platforms are capstans 12 that are used for locating the railroad cars at any desired point on the platforms.

The bales of cotton are handled in a plant of this construction as follows: The bales are unloaded from the inbound cars, ships or other conveyances, onto the receiving platform 1. As the bales are mixed up, both as to grades and as to owners, it is necessary to assort and examine them on the receiving platform and provide them with tags designating their grade and their owner. A bale is then placed on one of the conveyers which travel past the particular warehouse where it is to be stored and when the bale reaches the warehouse the man in charge thereof can tell by the tag on the bale that it is to be stored in this particular warehouse so he removes the bale from the conveyer. Accordingly, the bales of different grades or those belonging to different owners can be stored in their respective warehouses or compartments with very little manual labor so that the cost of operating the plant is reduced to a minimum.

When the bales are to be compressed they are removed from the warehouses, preferably through the rear doors 6ª thereof, and placed on the conveyers which travel past said rear doors, the conveyers carrying them to the compressor 11. After the bales have been compressed they are hooked onto the conveyers which travel on the track 9 that extends through the storage-house 10 and over the shipping platform 3 and are thus carried direct to the outbound cars, ships or other conveyances located alongside of the shipping platform. If there are no outbound cars at the shipping platform to receive the bales after they have been compressed, the bales are stored temporarily in the storage-house 10.

While I have shown the plant as having only two rows of warehouses it will, of course, be understood that it is immaterial so far as my idea is concerned how many rows of warehouses are employed.

Having thus described my invention, what I claim as new and desire to secure by Letters Patent is:

1. A plant for handling baled cotton comprising a receiving platform having surface railway tracks extending alongside thereof, a shipping platform located some distance from the receiving platform, spur tracks branching from the railway track at the receiving platform and extending alongside of the shipping platform, rows of warehouses arranged between the receiving and shipping platforms, and inclined overhead conveyer tracks extending from the receiving platform past said warehouses to the shipping platform, a storage house located adjacent said shipping platform and having the conveyer tracks extending therethrough and a cotton compressor arranged inside of said storage house; substantially as described.

2. A plant for handling baled cotton comprising a plurality of rows of warehouses built on an incline, a receiving platform at the high end of said incline, a shipping platform at the low end of said incline, a temporary storage house located adjacent said shipping platform and having a cotton compressor arranged therein, and a gravity operated conveyer system comprising elevated tracks that extend over the receiving and shipping platforms and on opposite sides of the warehouses of each row and through said temporary storage house; substantially as described.

3. A plant for handling baled cotton comprising receiving and shipping stations, surface railway tracks arranged adjacent thereto, means for moving the cars on said tracks, a plurality of rows of warehouses arranged between said stations, a temporary storage house located adjacent the shipping station, means inside of said storage house for compressing bales of cotton, and gravity-operated means traveling from the receiving station past said warehouses and through the storage house to the shipping station for carrying bales of cotton; substantially as described.

In testimony whereof I hereunto affix my signature in the presence of two witnesses, this 19 day of February, 1907.

JOHN R. FORDYCE.

Witnesses:
L. RIPLEY,
C. H. WHITHENGTON.